United States Patent
Botti et al.

(10) Patent No.: US 9,534,093 B2
(45) Date of Patent: Jan. 3, 2017

(54) METHOD OF PRODUCING A RUBBER COMPOUND COMPRISING SILICA

(71) Applicant: BRIDGESTONE CORPORATION, Chuo-ku, Tokyo (JP)

(72) Inventors: Francesco Botti, Rome (IT); Alessandra Bartoloni, Rome (IT); Giancarlo Cossu, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 26 days.

(21) Appl. No.: 14/395,349

(22) PCT Filed: Apr. 18, 2013

(86) PCT No.: PCT/IB2013/053081
§ 371 (c)(1),
(2) Date: Oct. 17, 2014

(87) PCT Pub. No.: WO2013/156962
PCT Pub. Date: Oct. 24, 2013

(65) Prior Publication Data
US 2015/0119516 A1 Apr. 30, 2015

(30) Foreign Application Priority Data
Apr. 18, 2012 (IT) .............................. TO2012A0347

(51) Int. Cl.
| | |
|---|---|
| *C08F 36/06* | (2006.01) |
| *B60C 1/00* | (2006.01) |
| *C08K 3/36* | (2006.01) |
| *C08J 3/20* | (2006.01) |
| *C08F 36/08* | (2006.01) |
| *C08F 2/44* | (2006.01) |
| *C08L 21/00* | (2006.01) |
| *C08K 7/18* | (2006.01) |
| *C08K 5/548* | (2006.01) |

(52) U.S. Cl.
CPC .............. *C08J 3/203* (2013.01); *B60C 1/0016* (2013.04); *C08F 2/44* (2013.01); *C08F 36/06* (2013.01); *C08F 36/08* (2013.01); *C08K 3/36* (2013.01); *C08L 21/00* (2013.01); *C08K 5/548* (2013.01); *C08K 7/18* (2013.01)

(58) Field of Classification Search
CPC ............. C08F 36/06; C08F 36/08; C08F 2/44; B60C 1/0016; C08K 3/36; C08K 7/18; C08K 5/548; C08J 3/203; C08L 21/00
USPC ......................................................... 524/493
See application file for complete search history.

(56) References Cited

U.S. PATENT DOCUMENTS 6,359,034 B1 * 3/2002 Visel ........................ C08J 3/215
152/209.1
2003/0125474 A1  7/2003  Yatsuyanagi

OTHER PUBLICATIONS

Database WPI, Week 200941, Thomson Scientific, London, GB; XP002689021, & CN 101 418 063 A (Agric Prod Processing Res Inst Chinese A), Apr. 29, 2009, abstract.
Database WPI, Week 201120, Thomson Scientific, London, GB; XP002689022, & JP 2011 046875 A (Sumitomo Rubber Ind Ltd), Mar. 10, 2011, abstract.
International Search Report for PCT/IB2013/053081 dated Apr. 18, 2013.
Written Opinion for PCT/IB2013/053081 dated Apr. 18, 2013.

* cited by examiner

*Primary Examiner* — Angela C Scott
(74) *Attorney, Agent, or Firm* — Sughrue Mion, PLLC

(57) ABSTRACT

A method of producing a rubber compound containing silica, the method including a step of dispersing the silica in a polymer base, and a following step of mixing the previously formed mixture with curing agents. The step of dispersing the silica in the polymer base includes the following sequence of operations: soaking the polymer base in a liquid silica precursor to form a swollen polymer; —adding the swollen polymer to an organic solvent, and continually stirring the swollen polymer solution; —adding water and a silica synthesizing catalyst to the swollen polymer solution; —precipitating a polymer gel matrix by adding a precipitating agent; —separating and washing the precipitated polymer gel matrix.

8 Claims, No Drawings

METHOD OF PRODUCING A RUBBER COMPOUND COMPRISING SILICA

CROSS REFERENCE TO RELATED APPLICATIONS

This application is a National Stage of International Application No. PCT/IB2013/053081 filed Apr. 18, 2013, claiming priority based on Italian Patent Application No. TO2012A000347, filed Apr. 18, 2012, the contents of all of which are incorporated herein by reference in their entirety.

TECHNICAL FIELD

The present invention relates to a method of producing a rubber compound comprising silica.

Hereinafter, the term 'swollen polymer' is intended to mean a polymer base, which is increased in volume by diffusing in it a liquid substance in which it is soaked.

BACKGROUND ART

Silica has long been used as a reinforcing filler in rubber compounds for tyres, particularly treads.

Silica is used as a partial or total substitute for carbon black, for the advantages it affords in terms of rolling resistance and wet performance.

As is known, silica poses various drawbacks, due to the difficulty in dispersing it in the polymer base.

This is due to the presence on silica of surface silanol groups, which promote the formation of hydrogen bonds, and therefore silica particle clusters, and impart to the silica hydrophilic characteristics incompatible with the hydrophobic characteristics of rubber.

Obviously, poor silica dispersion in the compound results in a wide variation and lack of uniformity in the physical and mechanical characteristics, and especially poor wear resistance, of the compound. To solve the dispersion problem, silane bonding agents have long been used to prevent the formation of hydrogen bonds, by bonding with the silanol groups, while at the same time bonding the silica chemically to the polymer base.

Dispersing silica evenly in the polymer base, and therefore in the compound, calls for effective mixing. Normally, a first mixing stage, in which the polymer base is mixed with silica and the silane bonding agent, is followed by an additional mixing stage, in which nothing is added, and which serves solely to ensure correct silica dispersion. This additional mixing stage is followed by a final mixing stage, in which the curing agents are added and mixed with the mixture from the preceding stages.

Though improving silica dispersion, the additional mixing stage has the drawback of also stressing the polymer base, the repercussions of which will be clear to anyone skilled in the art. In other words, mixing alone is not enough to improve silica dispersion in the polymer base, without also compromising the characteristics of the polymer base itself.

DISCLOSURE OF INVENTION

It is an object of the present invention to provide a method of producing rubber compounds, the technical characteristics of which are such as to ensure effective silica dispersion without subjecting the polymer base to prolonged mixing.

According to the present invention, there is provided a method of producing a rubber compound comprising silica; said method comprising a step of dispersing the silica in a polymer base, and a following step of mixing the previously formed mixture with curing agents; the method being characterized in that the step of dispersing the silica in the polymer base comprises the following sequence of operations:

soaking said polymer base in a liquid silica precursor to form a swollen polymer;

adding said swollen polymer to an organic solvent, and continually stirring the swollen polymer solution;

adding water and a silica synthesizing catalyst to the swollen polymer solution;

precipitating a polymer gel matrix by adding a precipitating agent;

separating and washing the precipitated polymer gel matrix.

Preferably, said swollen polymer solution comprises 5 to 35 percent by weight of polymer base, and 0.5 to 30 percent by weight of said silica precursor.

Preferably, the silica particles formed by adding water and the catalyst are 5 to 100 nanometers in diameter.

Preferably, said silica precursor is in the group consisting of tetraalkoxysilanes, polysulphide silanes, free mercaptosilanes and blocked mercaptosilanes.

Preferably, said silica precursor is tetraethoxysilane.

Preferably, said silica synthesizing catalyst is a base catalyst.

Preferably, said step of dispersing the silica in the polymer base comprises adding a silane bonding agent after synthesizing the silica.

Preferably, the polymer base is selected from the group consisting of SBR, BR and natural rubber, used individually or mixed with one another.

According to the present invention, there is also provided a rubber compound produced using the method according to the present invention.

According to the present invention, there is also provided a tyre comprising at least one portion made from a compound produced using the method according to the present invention.

BEST MODE FOR CARRYING OUT THE INVENTION

The following are non-limiting examples for a clearer understanding of the present invention.

Examples

A compound (Compound A) was produced in accordance with the present invention, and two control compounds (Compounds B and C) were produced with the same formula as Compound A, but using a conventional mixing method. More specifically, Compound B was produced using the following procedure:

($1^{st}$ Mixing Step)

Before commencing the mixing operation, a 230-270-liter tangential-rotor mixer was loaded with the cross-linkable polymer base, silica, silane bonding agent and oil, to a fill factor of 66-72%.

The mixer was operated at 40-60 rpm speed, and the resulting mixture was unloaded on reaching a temperature of 140-160° C.

($2^{nd}$ Mixing Step)

The curing system was added to the mixture from the preceding step, to a fill factor of 63-67%.

The mixer was operated at 20-40 rpm speed, and the resulting mixture was unloaded on reaching a temperature of 100-110° C.

Compound C was produced using the same procedure as for Compound B, but with the addition of an intermediate mixing step, in which the mixture from the first mixing step was mixed further in a mixer, operated at 40-60 rpm speed, and was unloaded on reaching a temperature of 130-150° C.

Table I shows the formulas of Compounds B and C, and the mixing steps performed using a conventional Banbury mixer.

TABLE I

| | | COMPOUND B | COMPOUND C |
|---|---|---|---|
| First mixing step | S-SBR | 100 | |
| | Silica | 60 | |
| | SI75 | 3 | |
| | Processing agent | 5 | |
| Intermediate mixing step | | NO | YES |
| Second mixing step | Sulphur | 1.5 | |
| | Curing agents | 3.5 | |
| | Antioxidants | 2.5 | |

The S-SBR polymer phr value refers to the dry polymer.

The silica used is marketed by Evonik under the trade name Ultrasil, and has a 130 m2/g surface area.

Compound A

To produce Compound A, a polymer composition comprising silica was produced using the following sol-gel procedure:

250 g of tetraethoxysilane was deposited on 100 g of S-SBR, which was allowed to swell for 6 hours;

the swollen polymer was dissolved in 1.5 liters of THF, and the resulting solution stirred slowly for 24 hours;

5 g of n-hexylamine and 58 g of water were added to the swollen polymer solution, which was stirred for 30 hours at ambient temperature; it is particularly important that the silica synthesizing catalyst only be added after the swollen polymer is dissolved in the organic solvent;

next, 7 g of SI75 silane bonding agent were added, and the solution stirred for 72 hours at 50° C.; the silane bonding agent may be added later, after the polymer gel matrix is isolated as described below, but it is important that it only be added after the silica is formed from its precursor; using FIB-SEM instrumentation, the resulting silica particles were found to have a mean diameter of 80 nm, and a very shallow diameter distribution curve;

a polymer gel matrix was precipitated by adding acetone;

the precipitated polymer gel matrix was separated and dried.

In this way, the polymer composition comprising silica was obtained.

The polymer composition was then subjected to the second mixing step, performed in the same way and with the same ingredients as indicated above for Compounds B and C.

Compound A therefore has the same composition as Compounds B and C, but is produced differently. So any differences in the characteristics of the three compounds is attributable solely to the way in which they are produced.

Compounds A-C were tested to determine rolling resistance, abrasion resistance, wet-road-holding performance, and viscosity. Abrasion resistance was measured as per DIN Standard 53516; viscosity was measured as per ASTM Standard D1646; and rolling resistance and wet-road-holding performance were extrapolated from Tan δ values measured as per ASTM Standard D5992.

Table II shows the above test values indexed with respect to the Compound B values.

TABLE II

| | COMPOUND A | COMPOUND B | COMPOUND C |
|---|---|---|---|
| Rolling Resistance | 110 | 100 | 102 |
| Abrasion Resistance | 110 | 100 | 103 |
| Wet Performance | 100 | 100 | 100 |
| Viscosity | 90 | 100 | 90 |

As shown clearly by the results in Table II, the method according to the present invention greatly improves silica dispersion, as compared with that achievable even by an additional mixing step. In fact, as shown by the results in Table II, an additional mixing step provides for improvements in rolling resistance, abrasion resistance and viscosity (comparison of Compounds C and B), but using a polymer gel matrix in accordance with the present invention provides for an even greater improvement in rolling and abrasion resistance (comparison of Compounds A and C). As will be clear to anyone skilled in the art, these improvements are a clear indication of improved silica dispersion within the polymer base.

The method according to the present invention also affords advantages in terms of output, by enabling production of a single quantity of polymer gel matrix, from which to produce numerous silica-containing rubber compounds in one mixing step, in which the curing agents are added.

The invention claimed is:

1. A method of producing a rubber compound comprising silica; said method comprising a step of dispersing the silica in a polymer base, and a following step of mixing with curing agents a mixture obtained from dispersing the silica in the polymer base; the method comprising the step of dispersing the silica in the polymer base comprises the following sequence of operations:

soaking said polymer base in a liquid silica precursor to form a swollen polymer;

adding said swollen polymer to an organic solvent, and continually stirring the swollen polymer solution;

adding water and a silica synthesizing catalyst to the swollen polymer solution;

precipitating a polymer gel matrix by adding a precipitating agent;

separating and washing the precipitated polymer gel matrix.

2. A method as claimed in claim 1, characterized in that said swollen polymer solution comprises 5 to 35 percent by weight of polymer base, and 0.5 to 30 percent by weight of said silica precursor.

3. A method as claimed in claim 1, characterized in that silica particles formed by adding water and the catalyst are 5 to 100 nanometers in diameter.

4. A method as claimed in claim 1, characterized in that said silica precursor is comprised in the group consisting of tetraalkoxysilanes, polysulphide silanes, free mercaptosilanes and blocked mercaptosilanes.

5. A method as claimed in claim 4, characterized in that said silica precursor is tetraethoxysilane.

6. A method as claimed in claim 1, characterized in that said silica synthesizing catalyst is a base catalyst.

7. A method as claimed in claim 1, characterized in that said step of dispersing the silica in the polymer base comprises adding a silane bonding agent after adding water and a silica synthesizing catalyst to the swollen polymer solution.

8. A method as claimed in claim 1, characterized in that the polymer base is selected from the group consisting of styrene-butadiene rubber (SBR), butadiene rubber (BR) and natural rubber, used individually or mixed with one another.

* * * * *